United States Patent
Hicks, III (10) Patent No.: US 8,818,462 B2
(45) Date of Patent: *Aug. 26, 2014

(54) METHODS, SYSTEMS AND KEY FOB APPARATUSES FOR FACILITATING HANDS FREE MOBILE COMMUNICATIONS FROM WITHIN AN AUTOMOTIVE VEHICLE

(75) Inventor: John A. Hicks, III, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/871,135

(22) Filed: Aug. 30, 2010

(65) Prior Publication Data
US 2011/0053561 A1 Mar. 3, 2011

Related U.S. Application Data

(63) Continuation of application No. 10/955,879, filed on Sep. 30, 2004, now Pat. No. 7,805,169.

(60) Provisional application No. 60/608,168, filed on Sep. 8, 2004.

(51) Int. Cl.
*H04M 1/00* (2006.01)

(52) U.S. Cl.
USPC ............ 455/569.2; 455/569.1; 455/558; 455/575.9

(58) Field of Classification Search
USPC .............. 455/569.1, 569.2, 558, 575.9
See application file for complete search history.

(56) References Cited

U.S. PATENT DOCUMENTS

| 5,675,628 A | 10/1997 | Hokkanen |
| 2002/0032048 A1 | 3/2002 | Kitao et al. |
| 2002/0082058 A1 * | 6/2002 | Baratono et al. ............ 455/569 |
| 2002/0086701 A1 | 7/2002 | Salmi et al. |
| 2004/0230348 A1 * | 11/2004 | Mann et al. ...................... 701/1 |
| 2005/0215286 A1 | 9/2005 | Brass et al. |

* cited by examiner

*Primary Examiner* — Justin Lee
(74) *Attorney, Agent, or Firm* — Cantor Colburn LLP (57) ABSTRACT

Methods, systems, and key fob apparatuses for facilitating hands free mobile communications from within an automotive vehicle are provided. The apparatus includes a key fob with a housing and a SIM associated with the housing. The SIM is operative to identify a subscriber to a mobile telephone network when interfaced with the mobile telephone network. The apparatus may further include a key integrated with the key fob and operatively associated with the SIM. The key is operative to initiate the start of an engine of the automotive vehicle and interface the SIM with a mobile telephone, such as a GSM phone, integrated with the automotive vehicle. Thus, when the key is inserted into an ignition switch operatively associated with a SIM reader, the SIM identifies a subscriber to the mobile telephone network.

11 Claims, 6 Drawing Sheets

METHODS, SYSTEMS AND KEY FOB APPARATUSES FOR FACILITATING HANDS FREE MOBILE COMMUNICATIONS FROM WITHIN AN AUTOMOTIVE VEHICLE

CROSS REFERENCE TO RELATED APPLICATIONS

This application is a continuation of U.S. patent application Ser. No. 10/955,879 filed Sep. 30, 2004, the entire contents of which are incorporated herein by reference, which claims priority to U.S. Provisional Application No. 60/608,168 filed Sep. 8, 2004, the entire contents of which are incorporated herein by reference.

FIELD OF THE INVENTION

The present invention relates to hands free mobile or cellular communication in automotive vehicles. More particularly, but not exclusively, the present invention relates to methods, systems, and apparatuses for facilitating hands free mobile communications from within automotive vehicles.

BACKGROUND OF THE INVENTION

The use of cellular phones in automobiles has increased significantly. However, historically it has been difficult and/or expensive for automobile manufacturers to provide in-vehicle "hands free" operation of cellular phone handsets. Due to mechanical and electrical differences among cellular phone designs, automobile manufacturers have not been successful in providing users a standard handset cradle capable of accommodating cellular phones from a wide variety of manufacturers.

Manufacturers have had some limited success in supporting hands free operation of cellular phones. However, the support is limited to specific handsets produced by specific handset manufacturers and supporting a single communications system technology, such as Advance Mobile Phone Service (AMPS). Meanwhile, there is increasing pressure to mandate the use of "hands free" technology in automobiles for use of cellular phones.

One communications system, Global System for Mobile communication (GSM), has become a dominant cellular technology in the world market. A key component of GSM technology is the Subscriber Identity Module (SIM). The primary role of the SIM is to authenticate a user on the GSM network and facilitate billing. SIMs are issued by GSM network service providers to subscribers. Subscribers can move their SIMs, in the form of SIM cards, from one GSM phone to another GSM phone, thus transferring their identity.

It is with respect to these and other considerations that the present invention has been made.

SUMMARY OF THE INVENTION

Embodiments of the present invention provide methods, systems and key fob apparatuses for facilitating hands free mobile communications from within an automotive vehicle. Mobile phone technology is built into automotive vehicles and integrated with in vehicle microphones, radio, antenna, and speakers to support hands free operation and communication. A means for receiving a SIM of a variety of subscribers, such as a slot and/or an ignition switch operatively associated with a SIM reader, is also provided. Thus, when subscribers enter any automotive vehicle equipped with an integrated mobile phone, such as a GSM phone, they simply plug in their SIM, for example into the SIM slot, and are able to use the integrated mobile phone as their own.

One embodiment of the present invention is a method for facilitating hands free mobile communications from within an automotive vehicle. The method involves provisioning mobile phone technology within the automotive vehicle and providing a means, such as a SIM slot or ignition switch, for receiving a SIM, such as a SIM card, of a subscriber within the automotive vehicle. The method also involves providing a SIM reader for reading data from the SIM of the subscriber and upon receiving the SIM, reading data from the SIM of the subscriber to authenticate the subscriber on a mobile network thereby activating the provisioned mobile phone technology within the automotive vehicle. Provisioning the mobile phone technology within the automotive vehicle involves integrating a mobile phone with an antenna, a radio, a microphone, and a speaker of the automotive vehicle whereby hands free operation of the mobile phone and communication are facilitated.

Another embodiment of the present invention is an apparatus for facilitating hands free wireless communication from within an automotive vehicle equipped with an integrated mobile phone. The apparatus includes a key fob with a housing and a SIM associated with the housing. The SIM is operative to identify a subscriber to a mobile telephone network when interfaced with the mobile telephone network. The apparatus may further include a key integrated with the key fob and operatively associated with the SIM. The key is operative to initiate the start of an engine of the automotive vehicle and interface the SIM with a mobile telephone, such as a GSM phone, integrated with the automotive vehicle. Thus, when the key is inserted into an ignition switch operatively associated with a SIM reader, the SIM identifies a subscriber to the mobile telephone network.

Still another embodiment of the present invention is a system for facilitating hands free wireless communication from within an automotive vehicle. The system includes a SIM operative to identify a subscriber to a mobile telephone network and a mobile telephone integrated into the automotive vehicle. The mobile telephone is operative to interface with the mobile telephone network. The system also includes a means for interfacing the SIM with the mobile telephone integrated into the automotive vehicle thereby activating the mobile phone and authenticating the subscriber with the mobile telephone network.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As described briefly above, embodiments of the present invention are directed to methods, systems and key fob apparatuses for facilitating hands free mobile communications from within an automotive vehicle. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1A:
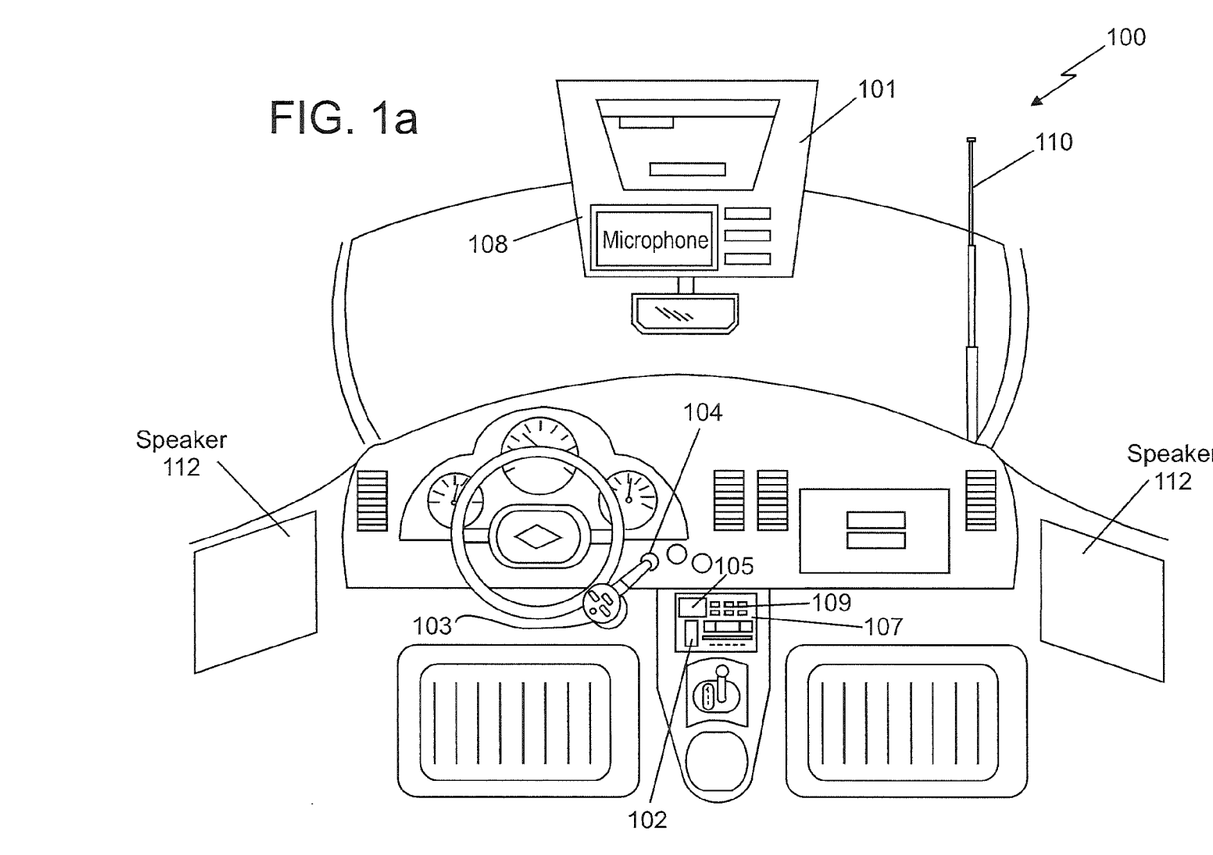
FIGS. 1a-1b show a perspective view of the interior of an automotive vehicle having an integrated mobile phone and a schematic block diagram of the control circuit of the integrated mobile phone and operating environment in a system according to an illustrative embodiment of the present invention.
Figure 1B:
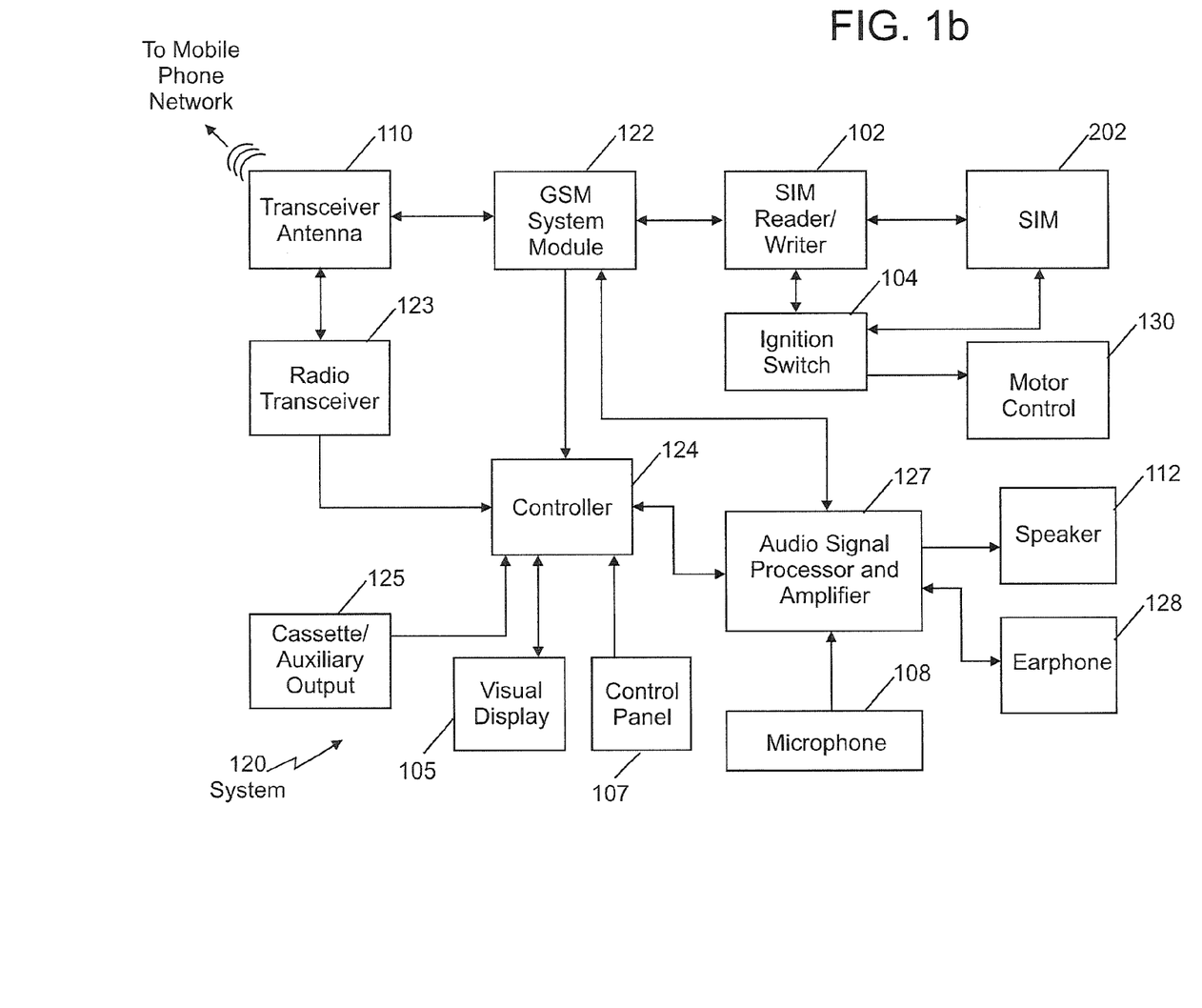

FIGS. 1a-1b show a perspective view of the interior of an automotive vehicle 100 having an integrated mobile phone and a schematic block diagram of the control circuit of the integrated mobile phone and operating environment in a system 120 for facilitating hands free mobile communications according to illustrative embodiments of the present invention. Referring to FIG. 1, the automotive vehicle 100 includes a system for facilitating hands free wireless communication from within the automotive vehicle 100. The automotive vehicle 100 includes an overhead console 101 mounted to the roof of the vehicle and housing a microphone 108 for voice input with the integrated mobile phone. The overhead console 101 may also house a keyless entry system capable of communication with a key fob 103, which transmits a radio frequency signal to a keyless entry receiver located within the overhead console 101. The key fob 103 also includes a removable or permanently integrated SIM for associating a subscriber with the integrated mobile phone of any vehicle that receives the SIM. The vehicle 100 also includes an antenna 110 for receiving and transmitting radio signals and wireless communications signals for delivering wireless service, speakers 112 for audio and mobile phone voice output, a console 107 near the dash board of the vehicle and housing integrated mobile phone components such as an input keypad 109 and display device 105. The console 107 may also include a SIM slot 102 which serves as a SIM reader/writer integrated with the mobile phone for receiving a SIM 202 (FIG. 1b), such as a SIM card, USIM or R-UIM, and interfacing the SIM 202 with the integrated phone and the mobile phone network.

In operation, the SIM may be removed from a user's portable handset phone and placed in the SIM slot 102 thereby associating the user with the integrated mobile phone in the automotive vehicle 100. Similarly, the vehicle 100 may also include an ignition switch 104 operative to receive a key having an integrated SIM 202 within the key fob 103 where the key also provides a data interface for the SIM 202 with a SIM reader/writer in connection with the ignition switch 104. Still further, a user may acquire multiple SIMs and house one of them in a key fob detached from the key. Upon entering the vehicle the user may remove the SIM from the key fob and insert the SIM in the SIM slot 102.

Turning now to FIG. 1b the control circuit of the system 120 for facilitating hands free mobile communications according to embodiments of the present invention will be described. The system 120 includes the SIM 202 operative to identify a subscriber to a mobile telephone network and a mobile telephone integrated into the automotive vehicle and operative to interface with the mobile telephone network. The integrated mobile telephone includes the SIM slot 102 and/or the ignition switch 104 which serve as a means for interfacing the SIM 202 with the integrated mobile telephone. The integrated mobile telephone also includes a GSM module 122, to which the antenna 110 is connected, for wireless operation with external GSM stations (not shown).

The system 120 also includes a controller 124 coupled to the GSM module 122 and an audio signal processor and amplifier 127. A cassette/auxiliary output module 125 and a radio transreceiver 123 are coupled to and transmit signals to the controller 124. The controller 124 then directs the signals to the appropriate output device such as the speaker 112 and/or the earphone 128. The antenna 110 is also connected to the radio receiver 123 to provide incoming radio signals to the system 120. The speaker 112 and earphone 128 may be connected to the audio signal processor and amplifier 127 for outputting audio signals. Additionally, the microphone 108 and the GSM module 122 are connected to the signal processor and amplifier 127 to provide input signals.

The controller 124 is used to control the signal input source of the audio signal processor and amplifier 127. For example, the controller 124 may determine whether signals from the GSM module 122 are directed to the audio signal processor and amplifier 127. The audio signal processor and amplifier 127 provides input and output volume amplification and/or transfer processing. The control panel 107 is connected to the controller 124 and may house the keypad 109 and display 105 for the integrated mobile phone. The display 105 may also be used for rendering data stored on the SIM. This data may include a phone directory of the subscriber or user.

The user can activate the integrated mobile phone and receive an incoming telephone call by interfacing the SIM 202 with the integrated mobile phone either through the ignition 104 or the SIM slot 102 serving as a SIM reader which may also include a SIM writer. The SIM reader is connected to the ignition switch 104 of the automotive vehicle 100. A key having a key fob 103 housing or in connection with the SIM 202 may serve as a means for interfacing the SIM 202 with the integrated mobile telephone. When the key is inserted into the ignition switch 104, the SIM reader 102 reads data from the SIM to authenticate the subscriber on the mobile network. After activating the integrated mobile phone, the user may receive an incoming call by using applicable keys on the keypad 109 of the control panel 107 or through a voice-operated mode. The user or driver may conduct a conversation through the speaker 112 and the microphone 108 or through the earphone 128 and the microphone 108.

Figure 2A:
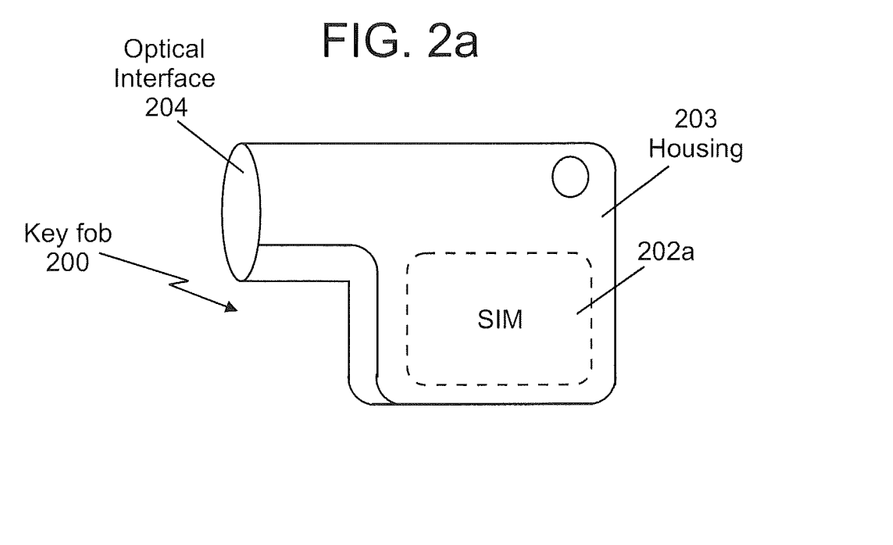
FIGS. 2a-2b show a perspective view of a key fob with an integrated key and SIM card and a block diagram illustrating an architecture of the SIM card according to an illustrative embodiment of the present invention.
Figure 2B:
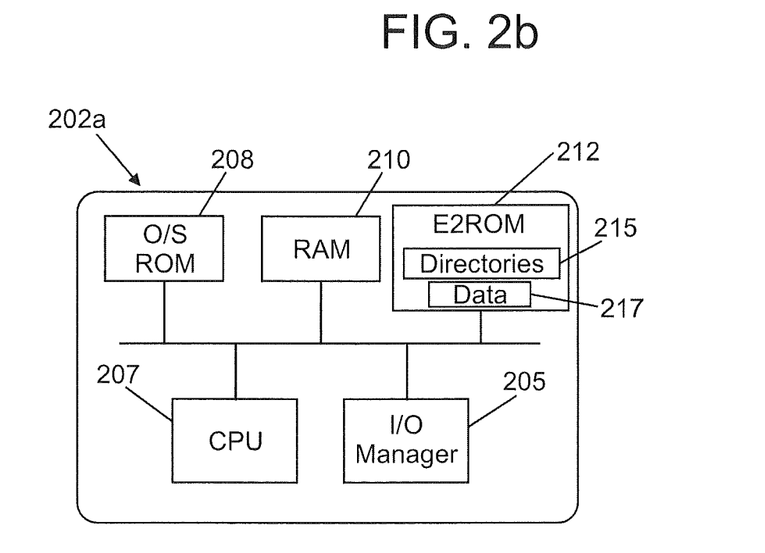

Referring now to FIGS. 2a-2b a perspective view of a key fob with an integrated key and SIM card and a block diagram illustrating an architecture of the SIM card according to an illustrative embodiment of the present invention will be described. The key fob 200 includes an optical interface 204 serving as a data interface operative to start the automotive vehicle. It should be appreciated that a key fob could include a conventional key, no key, or a digital interface key. The key fob 200 also includes a SIM 202a integrated into the housing 203 of the key fob 200. The SIM is in connection with the optical interface 204 such that when the optical interface is placed in the ignition switch 104, data from the SIM 202a is read by the SIM reader 102.

FIG. 2a depicts a block diagram of the SIM 202a architecture. The SIM 202a, such as a SIM card, is an integrated circuit card which can be removably inserted into a mobile phone handset or integrated into a key fob. The SIM 202a can contain a subscriber's identity, such as the subscriber's phone number, in a memory 212. The SIM 202a can also store a certain number of alphanumeric characters in order to facilitate a short message service (SMS).

The SIM 202a communicates with the integrated mobile phone to which it is connected via an input/output (I/O) manager 205. Data received by the SIM 202a is sent to an extended erasable read only memory (E.sup.2ROM), such as a "flash" E.sup.2ROM. Data 217 and/or directories 215 can also be output to the I/O manager 205. The remaining blocks include a CPU 207, a RAM 210 and an operating system (O/S) ROM 208.

Figure 3:
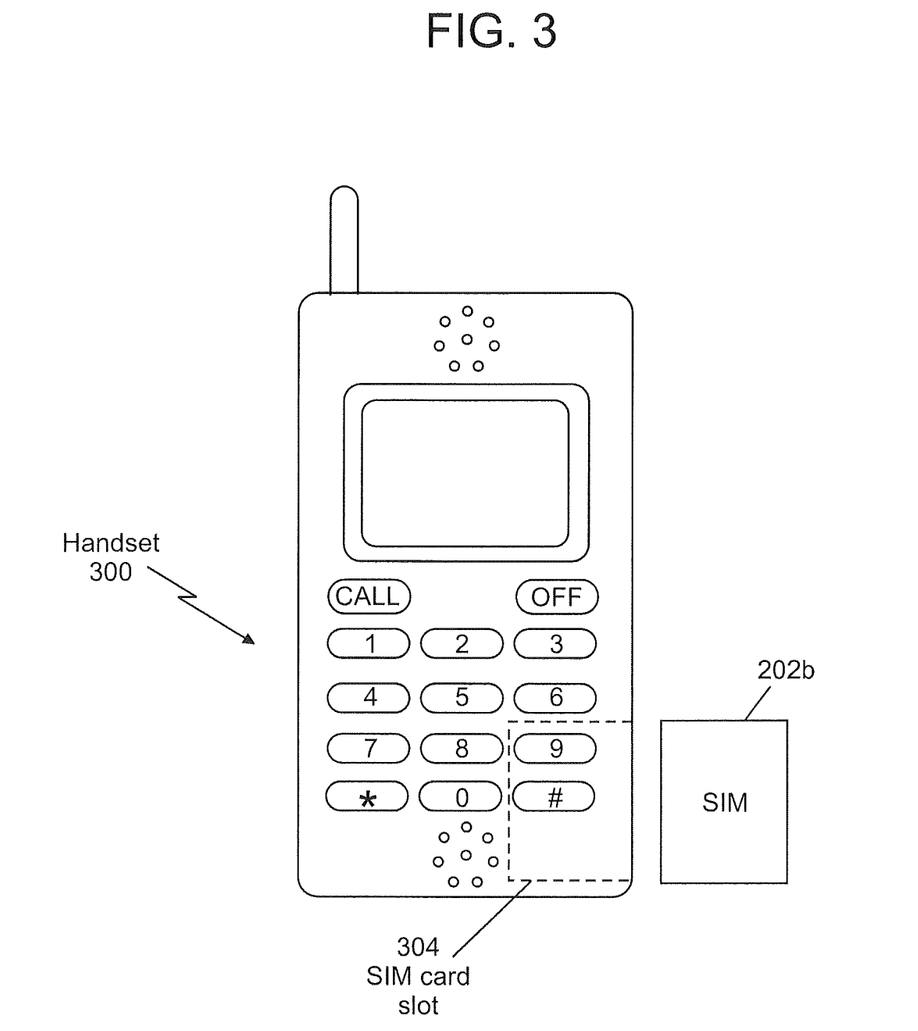
FIG. 3 is a front view of a conventional mobile phone handset equipped with a removable SIM card according to an illustrative embodiment of the present invention.

FIG. 3 is a front view of a conventional mobile phone handset 300 equipped with a removable SIM card 202b according to an illustrative embodiment of the present invention. The mobile phone handset 300 includes a SIM card slot 304 that houses the removable SIM card 202b when the mobile handset is in operation. The SIM card 202b may be removed from the mobile handset 300 when a driver enters the vehicle 100 and placed in the SIM slot 102 of the vehicle 100 to authenticate the driver as the user of the integrated mobile phone of the vehicle 100. It should be appreciated that the SIM card 202b of the subscriber may be one of a plurality of SIM cards that authenticate the subscriber with a mobile phone network.

Figure 4:
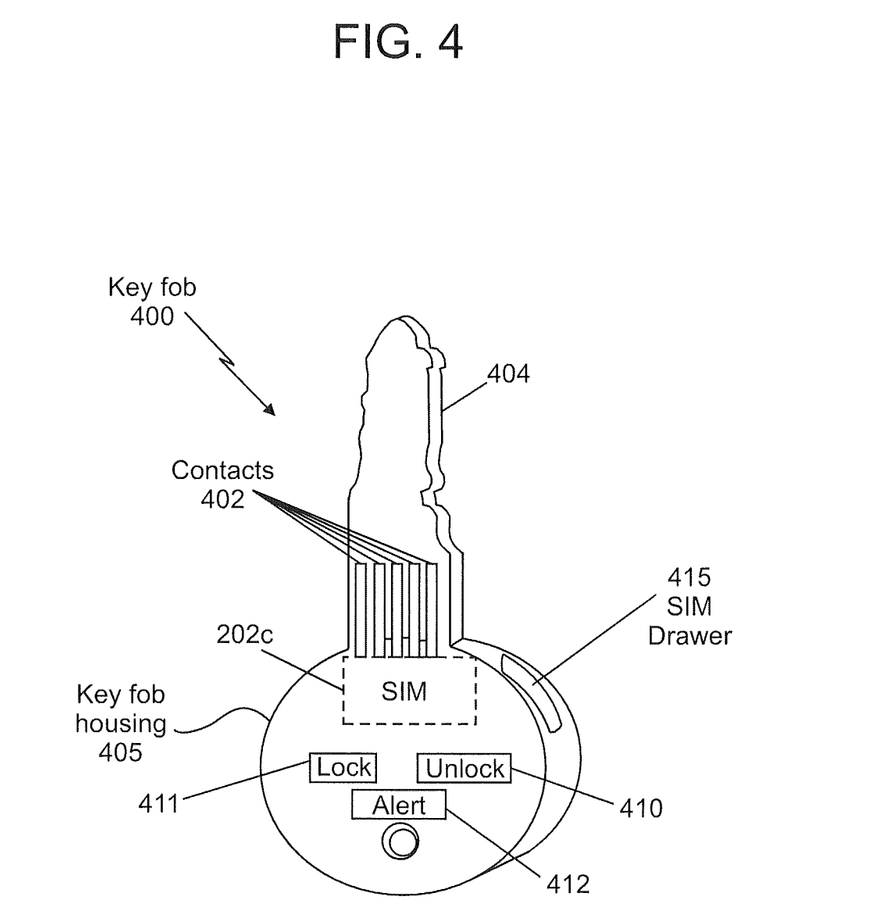
FIG. 4 shows a perspective view of a key fob having an integrated key in connection with a removable SIM card according to an illustrative embodiment of the present invention.

FIG. 4 shows a perspective view of a key fob 400 having an integrated key 404, for example an extended metal component, in connection with a removable SIM card 202c according to an illustrative embodiment of the present invention. The key fob 400 houses electronics operative to activate a remote keyless entry system of the automotive vehicle. The electronics interface with keyless entry remote buttons 410, 412, and 411 operative to initiate communication with a keyless entry receiver in the vehicle 100. The key 404 is also operative to initiate the start of the engine of the automotive vehicle 100.

The key fob 400 also includes contacts 402 in electrical connection with the key 404 and the SIM 202c. When the key 404 is inserted into an ignition, such as the ignition 102 of FIG. 1, the SIM 202c interfaces with the SIM reader 102 of the control circuit integrated into the vehicle 100 and identifies a subscriber to the mobile telephone network. The SIM 202c may also be removed via a SIM drawer 415. The SIM drawer 415 accepts the insertion of the SIM 202c into the key fob housing 405 and is operative to insert and remove the SIM 202c into and from the key fob housing 405.

Figure 5:
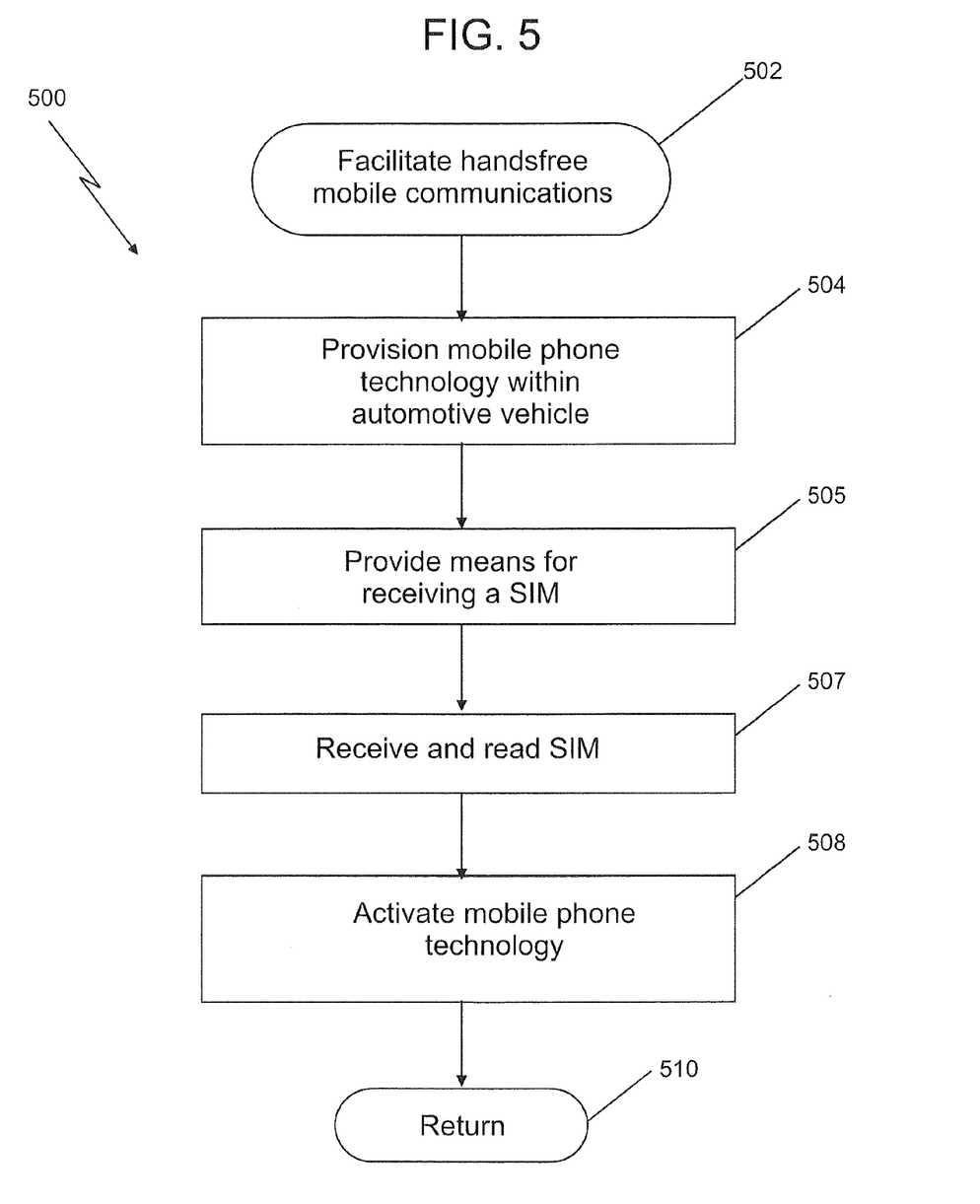
FIG. 5 illustrates a process for facilitating hands free mobile communication within an automotive vehicle according to an illustrative embodiment of the present invention.

FIG. 5 illustrates a process 500 for facilitating hands free mobile communication within the automotive vehicle 100 according to an illustrative embodiment of the present invention. The process 500 begins with operation 504 where mobile phone technology is provisioned within the automotive vehicle 100. The mobile phone technology may be GSM phone technology that includes a SIM card reader for reading a SIM 202 of a subscriber. Provisioning the mobile phone technology within the automotive vehicle may include integrating a mobile phone, such as a GSM phone, with the antenna 110, the radio 123, the microphone 108, and/or the speaker 112 of the automotive vehicle 100. The display 105 and keypad 109 of the mobile phone are in the console 107 integrated with the automotive vehicle 100. This provisioned configuration helps facilitate hands free operation of the mobile phone and communication.

The process 500 continues at operation 505 a SIM slot 102 and/or an ignition switch 104 interfaced with the mobile phone technology for receiving the SIM 202 of the subscriber is provided. The SIM 202 may be a removable part of a key fob, such as the key fob 400 shown in FIG. 4. The SIM 202 may also be integrated with a key fob having an integrated key in connection with the SIM 202 such that when the key is inserted into the ignition switch 104, the SIM is interfaced with and read by the integrated mobile phone.

Next, the process 500 continues at operation 507 where the SIM 202 of the subscriber is received and read by the SIM reader to authenticate the subscriber on a mobile phone network. The process 500 then continues to operation 508 where in response to reading the SIM, the mobile phone technology is activated.

As described herein, methods, systems, and key fob apparatuses for facilitating hands free mobile communication from within an automotive vehicle are provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A system for facilitating hands free wireless communication from within an automotive vehicle, the system comprising:

a subscriber identity module operative to identify a subscriber to a mobile telephone network and activate mobile telephone technology;

a mobile telephone integrated into the automotive vehicle and operative to interface with the mobile telephone network, the mobile telephone technology including a subscriber identity module reader and a subscriber identity module writer in the automotive vehicle; and an interface interfacing the subscriber identity module with the mobile telephone integrated into the automotive vehicle;

a console display within the automotive vehicle for rendering data stored on the subscriber identity module, wherein the data includes a telephone directory of the subscriber;

wherein the subscriber identity module is integrated with a key fob, wherein the interface includes an ignition switch operatively associated with the subscriber identity module reader and the subscriber identity module writer of the mobile tele phone technology, the ignition switch interfacing the subscriber identity module with the subscriber identity module reader and the subscriber identity module writer;

wherein the interface for interfacing the subscriber identity module with the mobile telephone comprises a key operatively associated with the subscriber identity module wherein when the key is inserted into the ignition switch, the subscriber identity module reader reads data from the subscriber identity module.

2. The system of claim 1, wherein the subscriber identity module is a removable part of the key fob.

3. The system of claim 1, wherein the key fob includes electrical contacts operatively associated with the subscriber identity module for interfacing the subscriber identity module with the subscriber identity module reader via the ignition switch.

4. The system of claim 1, wherein the subscriber identity module is transferable from a mobile telephone handset to the key fob.

5. The system of claim 1, wherein the subscriber identity module of the subscriber is one of a plurality of subscriber identity modules that authenticate the subscriber with the mobile network.

6. A system for facilitating hands free wireless communication from within an automotive vehicle, the system comprising:
- a subscriber identity module operative to identify a subscriber to a mobile telephone network and activate mobile telephone technology;
- a mobile telephone integrated into the automotive vehicle and operative to interface with the mobile telephone network, the mobile telephone technology including a subscriber identity module reader in the automotive vehicle;
- an interface interfacing the subscriber identity module with the mobile telephone;
- a console display within the automotive vehicle for rendering data stored on the subscriber identity module, wherein the data includes a telephone directory of the subscriber;
- wherein the subscriber identity module is integrated with a key fob, wherein the interface includes an ignition switch operatively associated with the subscriber identity module reader, the ignition switch interfacing the subscriber identity module with the subscriber identity module reader;
- wherein the mobile telephone technology further comprises a subscriber identity module writer for writing data to the subscriber identity module and a console keypad for data interfacing with the mobile telephone.

7. The system of claim 6, wherein the subscriber identity module is a removable part of the key fob.

8. The system of claim 6, wherein the key fob comprises an optical interface for communicating with the ignition switch and the subscriber identity module reader.

9. The system of claim 6, wherein the key fob includes electrical contacts operatively associated with the subscriber identity module for interfacing the subscriber identity module with the subscriber identity module reader via the ignition switch.

10. The system of claim 6, wherein the subscriber identity module is transferable from a mobile telephone handset to the key fob.

11. The system of claim 6, wherein the subscriber identity module of the subscriber is one of a plurality of subscriber identity modules that authenticate the subscriber with the mobile network.

* * * * *